(12) United States Patent
Sun et al.

(10) Patent No.: US 10,586,285 B2
(45) Date of Patent: Mar. 10, 2020

(54) SECURITIES INFORMATION DISPLAY METHOD, APPARATUS, AND SYSTEM

(71) Applicant: TENCENT TECHNOLOGY (SHENZHEN) COMPANY LIMITED, Shenzhen (CN)

(72) Inventors: Xiao Sun, Shenzhen (CN); Kexin Song, Shenzhen (CN); Junyi Cai, Shenzhen (CN); Yingxue Liu, Shenzhen (CN); Chengjun Li, Shenzhen (CN); Xiaopeng Song, Shenzhen (CN); Suning Wang, Shenzhen (CN); Yongjun Wang, Shenzhen (CN); Xinggang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 933 days.

(21) Appl. No.: 14/705,789

(22) Filed: May 6, 2015

(65) Prior Publication Data

US 2015/0235320 A1 Aug. 20, 2015

Related U.S. Application Data

(63) Continuation of application No. PCT/CN2013/086273, filed on Oct. 31, 2013.

(30) Foreign Application Priority Data

Nov. 8, 2012 (CN) .......................... 2012 1 0443915

(51) Int. Cl.
*G06Q 40/00* (2012.01)
*G06Q 40/06* (2012.01)
(Continued)

(52) U.S. Cl.
CPC .......... *G06Q 40/06* (2013.01); *G06F 3/0485* (2013.01); *G06F 3/04883* (2013.01); *G06Q 40/04* (2013.01)

(58) Field of Classification Search
None
See application file for complete search history.

(56) References Cited

U.S. PATENT DOCUMENTS 9,501,415 B1 * 11/2016 Racine ................ G06F 12/0875
9,811,507 B2 * 11/2017 Cranfill ................ G06F 17/214
(Continued)

FOREIGN PATENT DOCUMENTS

CN 101512473 A 8/2009
CN 101765236 A 6/2010
(Continued)

OTHER PUBLICATIONS

International Preliminary Report on Patentability for International Application No. PCT/CN2013/086273, dated May 21, 2015, 25 pages.
(Continued)

*Primary Examiner* — Jason Borlinghaus
(74) *Attorney, Agent, or Firm* — Sughrue Mion, PLLC (57) ABSTRACT

Implementation manners of the present disclosure put forward a securities information display method, apparatus, and system. The method includes: generating a securities information display interface, where the securities information display interface displays a display bitmap of a security; determining whether the securities information display interface receives a screen sliding event, where the screen sliding event is an event generated by sliding the securities information display interface; obtaining securities data of a security corresponding to the screen sliding event when the
(Continued)

screen sliding event is received; and updating the display bitmap based on the obtained securities data.

13 Claims, 6 Drawing Sheets

(51) Int. Cl.
*G06F 3/0485* (2013.01)
*G06F 3/0488* (2013.01)
*G06Q 40/04* (2012.01)

(56) References Cited

U.S. PATENT DOCUMENTS

| | | | |
|---|---|---|---|
| 2008/0062141 | A1 | 3/2008 | Chandhri |
| 2008/0178125 | A1 | 7/2008 | Elsbree et al. |
| 2012/0226628 | A1* | 9/2012 | Dai .................. G06Q 40/04 705/36 R |

FOREIGN PATENT DOCUMENTS

| | | |
|---|---|---|
| CN | 102289773 A | 12/2011 |
| CN | 102467734 A | 5/2012 |
| CN | 102609191 A | 7/2012 |
| CN | 102662598 A | 9/2012 |
| TW | 201133378 A | 10/2011 |

OTHER PUBLICATIONS

Office Action Issued in Chinese Application No. 201210443915.0 dated Apr. 21, 2017, 10 pages.

International Search Report for International Application No. PCT/CN2013/086273, dated Feb. 20, 2014.

Office Action Issued in Chinese Application No. 201210443915.0 dated Feb. 2, 2018.

* cited by examiner

SECURITIES INFORMATION DISPLAY METHOD, APPARATUS, AND SYSTEM

CROSS-REFERENCE TO RELATED APPLICATIONS

This application is a continuation of International Application No. PCT/CN2013/086273, filed on Oct. 31, 2013, which claims priority to Chinese Patent Application No. 2012104439150, filed with the Chinese Patent Office on Nov. 8, 2012 and entitled "SECURITIES INFORMATION DISPLAY METHOD, APPARATUS, AND SYSTEM", the disclosures of both of which are incorporated herein by reference in their entireties.

FIELD OF THE TECHNOLOGY

Implementation manners of the present disclosure relate to the field of information processing technologies, and specifically, to a securities information display method, apparatus, and system.

BACKGROUND OF THE DISCLOSURE

Nowadays, in this information age, all kinds of information devices emerge as the times require, for example, fixed-line phones and mobile phones used for voice transmission, servers and personal computers used for information resource sharing and processing, various televisions used for displaying video data, and the like. All these information devices are produced for solving actual demands in particular fields. With the arrival of electronic consumer, computers, and communications (3C) convergence, people pay more attention to studies on comprehensive utilization of information devices of various different fields, so as to make full use of existing resources and devices to obtain better services.

Securities are a general term for various certificates of economic rights and interests, and are a written certificate to prove that security holders have the right to obtain the proper rights and interests according to the content carried on the coupon. Securities generally include stocks, bonds, funds, warrants, and the like. The stock is a kind of negotiable securities. A stock detail page is a comprehensive page that collects a latest quote, a trend chart, and related information of the stock. After learning a latest quote of a stock by using an optional share list, if a user wants to know more detailed content of the stock, the user may enter a stock detail page of the stock.

SUMMARY

Implementation manners of the present disclosure provide a securities information display method, apparatus, and system, which improve switchover efficiency of securities information display.

A securities information display method, including:

generating a securities information display interface, the securities information display interface displaying a display bitmap of a security;

determining whether the securities information display interface receives a screen sliding event, the screen sliding event being an event generated by sliding the securities information display interface;

obtaining, when the screen sliding event is received, securities data of a security corresponding to the screen sliding event; and updating the display bitmap based on the obtained securities data.

A securities information display apparatus, including:

a display interface generating unit, configured to generate a securities information display interface, the securities information display interface displaying a display bitmap of a security;

a securities data obtaining unit, configured to determine whether the securities information display interface receives a screen sliding event, and obtain securities data of a security corresponding to the screen sliding event when the screen sliding event is received, the screen sliding event being an event generated by sliding the securities information display interface; and a display bitmap displaying unit, configured to update the display bitmap based on the obtained securities data.

A securities information display system, including:

a securities information display terminal, configured to generate a securities information display interface, the securities information display interface displaying a display bitmap of a security; and determine whether the securities information display interface receives a screen sliding event, request securities data of a security corresponding to the screen sliding event from a securities information server when the screen sliding event is received, and update the display bitmap based on the securities data, obtained from the securities information server, of the security corresponding to the screen sliding event, the screen sliding event being an event generated by sliding the securities information display interface; and a securities information server, configured to: in response to a request of the securities information display terminal, provide the securities data of the security corresponding to the screen sliding event for the securities information display terminal.

It can be seen from the foregoing technical solutions that, in the implementation manners of the present disclosure, a securities information display interface is generated first, where the securities information display interface displays a display bitmap of a security; whether the securities information display interface receives a screen sliding event is determined, and securities data of a security corresponding to the screen sliding event is obtained when the screen sliding event is received; and the display bitmap is updated based on the obtained securities data. It can be seen that, after the implementation manners of the present disclosure are applied, a finger interaction characteristic of sliding sensing technologies is fully utilized, which can improve a switchover speed of securities information display, so that the securities market can be reflected in time and a latest market trend is loaded, and switchover efficiency of securities information display is improved.

DESCRIPTION OF EMBODIMENTS

Normally, switchover between securities information may be triggered by using various click operations. For example, using stocks as an example, a stock in an optional share list may be clicked for entering a stock detail page of the stock, and click is performed again to return to a page of the optional share list during stock switchover, and then, another stock is clicked to enter a stock detail page of the stock; or, a switchover button is set on a stock detail page, switchover between stock detail pages of multiple stocks is implemented by using the switchover button; or, a stock code is entered in a securities search box to search for information of a corresponding stock.

However, the foregoing operations for switching securities information are rather complicated, can only be finished by multiple click operations, and include many operation steps, which increase switchover time for securities information display, thereby reducing switchover efficiency of securities information display. Actually, switchover time of securities information is extremely important for the ever-changing stock market. Therefore, theses application technologies about securities switchover cannot meet a high demand of a user for switchover efficiency of securities information display.

In addition, when a user follows a relative large number of securities, a cache mechanism is not considered in the foregoing triggering manners for securities information switchover; therefore, a switchover speed and data refreshing speed of securities information is relatively slow.

In order to solve the foregoing problem, implementation manners of the present disclosure put forward a securities information display method, apparatus, and system. In the implementation manners of the present disclosure, a finger interaction characteristic of sliding sensing technologies is fully utilized, which can improve a switchover speed of securities information display, so that the securities market can be reflected in time and a latest market trend is loaded, and switchover efficiency of securities information display is improved.

Figure 1A:
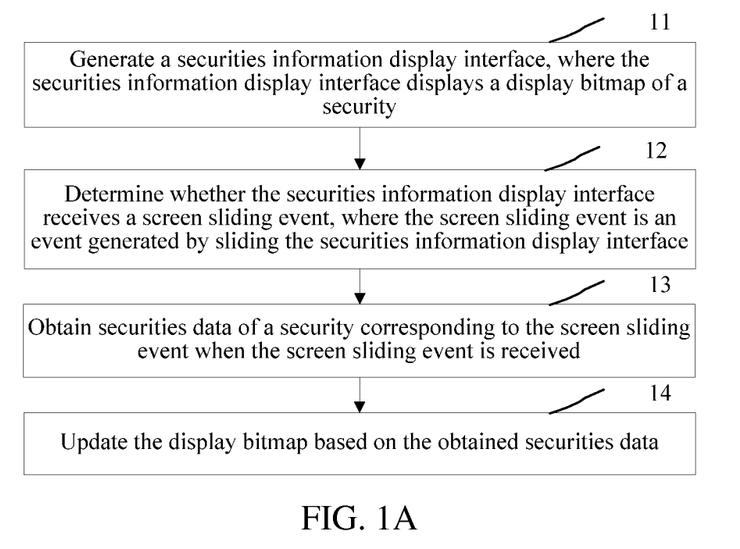
FIG. 1A is a schematic flowchart of a securities information display method according to an implementation manner of the present disclosure.

FIG. 1A is a schematic flowchart of a securities information display method according to an implementation manner of the present disclosure. As shown in FIG. 1A, the method may include:

Step 11: Generate a securities information display interface, where the securities information display interface displays a display bitmap of a security.

Step 12: Determine whether the securities information display interface receives a screen sliding event, where the screen sliding event is an event generated by sliding the securities information display interface.

Step 13: Obtain securities data of a security corresponding to the screen sliding event when the screen sliding event is received.

Step 14: Update the display bitmap based on the obtained securities data.

The foregoing securities information display interface may be displayed on a display screen of a securities information display terminal.

Figure 1B:
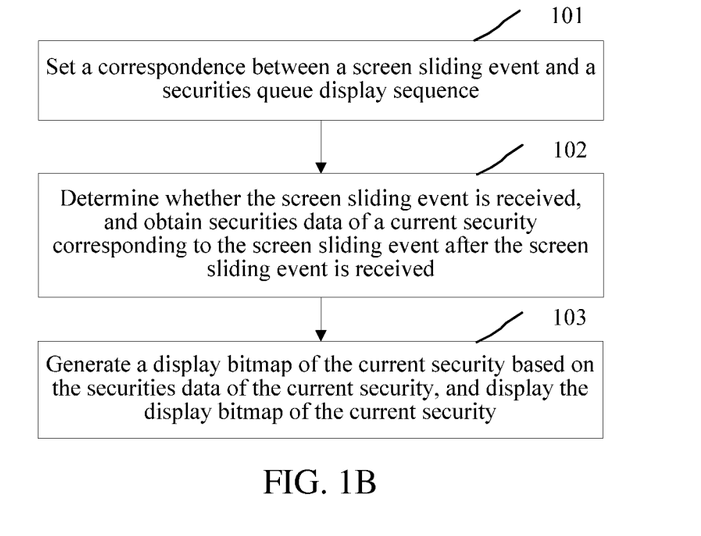
FIG. 1B is a schematic flowchart of a securities information display method according to an implementation manner of the present disclosure.

FIG. 1B is a schematic flowchart of a securities information display method according to an implementation manner of the present disclosure. As shown in FIG. 1B, the method may include:

Step 101: Set a correspondence between a screen sliding event and a securities queue display sequence.

Here, the correspondence between a screen sliding event and a securities queue display sequence may be set in a securities information display terminal. In an implementation manner, the securities information display terminal may be a handheld device. In this implementation manner of the present disclosure, a display sequence of a security may be briefly referred to as a sequence of the security.

In an implementation manner, the correspondence between a screen sliding event and a securities queue display sequence may also be set in a securities information server on a network side, and information about the set correspondence is obtained by the securities information display terminal from the securities information server.

In an implementation manner, the correspondence between a screen sliding event and a securities queue display sequence may include:

when the screen sliding event is sliding left, that is, the securities information display interface is slid left on a display screen of the securities information display terminal, an instruction corresponding to the screen sliding event is displaying corresponding data of a previous security in the securities queue display sequence, that is, corresponding data of a security preceding a currently-displayed security in the securities queue display sequence is displayed; and when the screen sliding event is sliding right, that is, the securities information display interface is slid right on a screen of a securities information display terminal, an instruction corresponding to the screen sliding event is displaying corresponding data of a next security in the securities queue display sequence, that is, corresponding data of a security subsequent to the currently-displayed security in the securities queue display sequence is displayed; or when the screen sliding event is sliding right, an instruction corresponding to the screen sliding event is displaying corresponding data of a previous security in the securities queue display sequence; and when the screen sliding event is sliding left, an instruction corresponding to the screen sliding event is displaying corresponding data of a next security in the securities queue display sequence.

The securities queue display sequence is used for indicating a relative display relationship of securities in a securities queue. The securities queue display sequence may be set individually by a user according to an optional share list, and may also be generated automatically by a machine. When there are a relatively large number of securities in the optional share list that need to be switched over, and there is no special rule, an entire display sequence may be edited individually by the user.

Securities may generally include stocks, bonds, funds, warrants, and the like. The securities information display method provided in this implementation manner of the present disclosure is described exemplarily in detail by using the stocks as an example.

For example, it is assumed that there are three stocks in a stock queue, codes of the stocks are 00001, 00002 and 00003 respectively, and a stock queue display sequence is also 00001, 00002 and 00003. It is assumed that it is set that when a screen sliding event is sliding right, a correspondence between the screen sliding event and the stock queue display sequence is displaying corresponding data of a next stock in the stock queue display sequence, that is, corresponding data of a stock subsequent to a currently-displayed stock in the stock queue display sequence is displayed. Assuming that a code of a current stock in the stock queue display sequence is 00002, when the received screen sliding event is sliding right, corresponding data of a stock having a stock code being 00003 is displayed.

The securities information display terminal may include, but is not limited to: a feature phone, a smart phone, a handheld computer, a personal computer (PC), a tablet computer, and a personal digital assistant (PDA). Moreover, the securities information display terminal may be applicable to any operating system of the securities information display terminal, which includes, but is not limited to: Android, Palm OS, Symbian, Windows mobile, Linux, iPhone OS, Black Berry OS 6.0, and Windows Phone series.

In an implementation manner, the securities information display terminal may use an Android operating system, and the securities information display terminal may also use various versions of Android, which include, but is not limited to: versions of Astro Boy (Android Beta), Clockwork Robot (Android 1.0), Cupcake (Android 1.5), Donut (Android 1.6), éclair (Android 2.0/2.1), Froyo (Android 2.2), Gingerbread (Android 2.3), Honeycomb (Android 3.0), Ice cream sandwich (Android 4.0), and Jelly Bean (Android 4.1). Specific versions of the Android platform are listed in detail above. A person skilled in the art may realize that this implementation manner of the present disclosure is not limited to the foregoing listed versions, and may also be applicable to any version that is based on the Android software architecture.

An exemplary setting for the correspondence between a screen sliding event and a securities queue display sequence is described in detail above. A person skilled in the art may realize that, based on requirements of a specific application environment, this setting can be adjusted; therefore, descriptions herein are only for explanation, and are not used to limit the protection scope of the implementation manners of the present disclosure.

Step 102: Determine whether the screen sliding event is received, and obtain securities data of a current security corresponding to the screen sliding event after the screen sliding event is received.

Here, the securities information display terminal listens to a local screen sliding event, and when the screen sliding event is received, current securities data of a current security corresponding to the screen sliding event is obtained from the securities information server on a network side.

For example, it is assumed that there are three stocks in a stock queue, codes of the stocks are 00001, 00002 and 00003 respectively, and a stock queue display sequence is also 00001, 00002 and 00003. It is assumed that it is set that when a screen sliding event is sliding right, a correspondence between the screen sliding event and the stock queue display sequence is: displaying corresponding data of a next stock in the stock queue display sequence. Moreover, assuming that a code of a current stock in the stock queue display sequence is 00002, when the screen sliding event received by the securities information display terminal is sliding right, corresponding data of a next stock of the current stock code 00002, that is, corresponding data of a stock having a stock code being 00003, is obtained from the securities information server on a network side.

Step 103: Generate a display bitmap of the current security based on the securities data of the current security, and display the display bitmap of the current security.

Here, a real-time chart of the current security may be generated based on the securities data of the current security. In an implementation manner, the real-time chart may include at least one of a 5-day K line chart, a daily K line chart, a weekly K line chart, a monthly K line chart, and a quarterly K line chart.

In an implementation manner, when the real-time chart is displayed, at the same time, information such as a latest quote and related information of the current security may further be displayed, so as to provide more reference information for decision of a user.

In an implementation manner, information such as the real-time chart, latest quote, and related information of the current security may be displayed comprehensively in a form of a stock detail page. After learning a latest quote of a security by using an optional share list, if a user wants to know more detailed content of the security, the user may enter a stock detail page of the security by using a screen sliding event.

In an implementation manner, because contents such as prices, trends of securities are updated in real time during a transaction period, in order to enable a user to quickly see latest data during a rapid switch to a new security, when it is switched to a stock detail page of the current security, at the same time, latest data of another security may be loaded automatically in the background and a market trend chart may be updated dynamically.

Specifically, after a screen sliding event for a current security is received, securities data of a subsequent security is further obtained, and a display bitmap of the subsequent security is generated based on the securities data of the subsequent security, and the display bitmap of the subsequent security is cached; whether a screen sliding event corresponding to displaying the subsequent security is received is determined, and if yes, the display bitmap of the subsequent security is obtained from a cache, and the display bitmap of the subsequent security is displayed. The subsequent security is a security subsequent to the current security in the securities queue display sequence.

For example, it is assumed that there are four stocks in a stock queue, codes of the stocks are 00001, 00002, 00003 and 00004 respectively, and a stock queue display sequence is also 00001, 00002, 00003 and 00004. It is assumed that it is set that when a screen sliding event is sliding right, a correspondence between the screen sliding event and the stock queue display sequence is displaying corresponding data of a next stock in the stock queue display sequence, that is, corresponding data of a stock subsequent to a currently-displayed stock in the stock queue display sequence is displayed. Assuming that a code of the currently-displayed stock in the stock queue display sequence is 00002, when the received screen sliding event is sliding right, corresponding data of a stock having a stock code being 00003 is displayed. Meanwhile, corresponding data of a stock subsequent to the stock having a stock code being 00003, that is, data of a stock having a stock code being 00004, is further obtained, and a display bitmap of the subsequent stock is generated based on the corresponding data of the subsequent stock, and the display bitmap of the subsequent stock is cached, that is, the display bitmap of the stock having a stock code being 00004 is cached; whether a screen sliding event corresponding to displaying the stock having a stock code being 00004 is received is determined, and if yes, the display bitmap of the stock having a stock code being 00004 is obtained from a cache, and the display bitmap of the stock having a stock code being 00004 is displayed.

In an implementation manner, after a screen sliding event for a current security is received, securities data of a preceding security is further obtained, and a display bitmap of the preceding security is generated based on the securities data of the preceding security, and the display bitmap of the preceding security is cached; whether a screen sliding event corresponding to displaying the preceding security is received is determined, and if yes, the display bitmap of the preceding security is obtained from a cache, and the display bitmap of the preceding security is displayed. The preceding security is a security preceding the current security in the securities queue display sequence.

For example, it is assumed that there are four stocks in a stock queue, codes of the stocks are 00001, 00002, 00003 and 00004 respectively, and a stock queue display sequence is also 00001, 00002, 00003 and 00004. It is assumed that it is set that when a screen sliding event is sliding right, a correspondence between the screen sliding event and the stock queue display sequence is displaying corresponding data of a next stock in the stock queue display sequence, that is, corresponding data of a stock subsequent to a currently-displayed stock in the stock queue display sequence is displayed. Assuming that a code of the currently-displayed stock in the stock queue display sequence is 00002, when the received screen sliding event is sliding right, corresponding data of a stock having a stock code being 00003 is displayed. Meanwhile, corresponding data of a stock preceding the stock having a stock code being 00003, that is, data of a stock having a stock code being 00002, is further obtained, and a display bitmap of the preceding stock is generated based on the corresponding data of the preceding stock, and the display bitmap of the preceding stock is cached, that is, the display bitmap of the stock having a stock code being 00002 is cached; whether a screen sliding event corresponding to displaying the stock having a stock code being 00002 is received is determined, and if yes, the display bitmap of the stock having a stock code being 00002 is obtained from a cache, and the display bitmap of the stock having a stock code being 00002 is displayed.

In an implementation manner, securities data of securities in multiple sequences may be displayed simultaneously according to sliding amplitude of a screen sliding event. For example, when a screen sliding event is received, if it is determined that sliding amplitude of the screen sliding event is less than a preset sliding amplitude threshold, a part of a display bitmap of a security corresponding to the screen sliding event and a part of a display bitmap of a subsequent security may be displayed simultaneously; and if it is determined that sliding amplitude of the screen sliding event is greater than a preset sliding amplitude threshold, only an entire display bitmap of a subsequent security is displayed.

In the foregoing process of using a pre-loading manner, two static Views may be prepared separately in advance at a left side and a right side of a current display view, and when a current security is displayed, at the same time, securities data of a preset number of securities that precede the current security and a preset number of securities that are subsequent to the current security is obtained, and interface filling, that is, filling of a display view, is completed. Then, when a user changes securities by sliding left or right on a screen, the prepared securities display views may be loaded directly, thereby speeding up a data display process.

It can be seen that, in this implementation manner of the present disclosure, when a security is switched for display, at the same time, latest data of another security (for example, a security subsequent to a current security) may be loaded automatically and a market trend chart may be updated dynamically, that is, a user completes functions of securities switchover and data refreshing only by using one sliding motion.

In an implementation manner, a bitmap drawing process and a bitmap display process may be pre-created; the bitmap drawing process generates a display bitmap of the current security based on securities data of a current security corresponding to a screen sliding event, and sends the display bitmap to the bitmap display process; and the bitmap display process displays the display bitmap of the current security.

It can be seen that, an independent bitmap drawing process is used to draw a real-time chart (a stock detail page displays a real-time chart by default), and a bitmap display process is only responsible for displaying the display bitmap, and does not participate in a drawing process of the display bitmap, so that this implementation manner of the present disclosure is implemented completely by division of labor between threads.

In an implementation manner, whether a securities queue display sequence changes may be determined further, and if yes, a changed securities queue display sequence is obtained; and a correspondence between a screen sliding event and the changed securities queue display sequence is set.

Specifically, when a securities queue display sequence on a securities information server changes, it is ensured by using a synchronization mechanism that a securities queue display sequence on a securities information display terminal can be consistent with the securities queue display sequence on the securities information server, so as to ensure that when a user switches securities information quickly, problems such as data display error do not occur.

In this implementation manner of the present disclosure, the securities information display terminal and the securities information server may be in communication connection by using a variety of wireless communications networks. According to a relationship between a direction and time of information transmission, communication manners between the securities information display terminal and the securities information server may be divided into simplex communication, half duplex communication, full duplex communication, and the like, which is not specifically limited in this implementation manner of the present disclosure.

In this implementation manner of the present disclosure, specific communications protocols may be agreed between the securities information display terminal and the securities information server. A format used by a data unit, information and meaning, a connection manner, and timing of information sending and receiving that should be included in an information unit are defined in these communications protocols, so as to ensure that data in a network is successfully delivered to a destination. For example, communications protocols that may be used in this implementation manner of the present disclosure include, but are not limited to: Transmission Control Protocol/Internet Protocol (TCP/IP), Hypertext Transfer Protocol (HTTP), Simple Mail Transfer Protocol (SMTP), Post Office Protocol 3 (POP3), and so on, which is not specifically limited in this implementation manner of the present disclosure.

In this implementation manner of the present disclosure, the securities information display terminal may perform information interaction with the securities information server by using a variety of communications standards. For example, various communications standards such as Global System for Mobile Communications (GSM), Wideband Code Division Multiple Access (WCDMA), Code Division Multiple Access 2000 (CDMA-2000), and Time Division-Synchronous Code Division Multiple Access (TD-SCDMA) may be used, which is not specifically limited in this implementation manner of the present disclosure.

An information interaction format between the securities information display terminal and the securities information server may have multiple forms. For example, an information format may include, but is not limited to: short message service (SMS), e-mail, instant messaging (IM) information, multimedia messaging service (MMS), or voice message, which is not specifically limited in this implementation manner of the present disclosure.

In an implementation manner, before the securities information server sends securities data to the securities information display terminal, the method may further include:

verifying, by the securities information server, whether an identity of the securities information display terminal is legal, and sending the securities data to the securities information display terminal only when the identity of the securities information display terminal is legal, where the verifying, by the securities information server, whether an identity of the securities information display terminal is legal may include: verifying whether a fingerprint of a user of the securities information display terminal is consistent with an authorized fingerprint, or verifying whether an iris of a user of the securities information display terminal is consistent with an authorized iris, or verifying whether an international mobile equipment identity (IMEI) of the securities information display terminal is legal, or verifying whether a screen saver password of the securities information display terminal is correct, and so on.

Figure 1C:
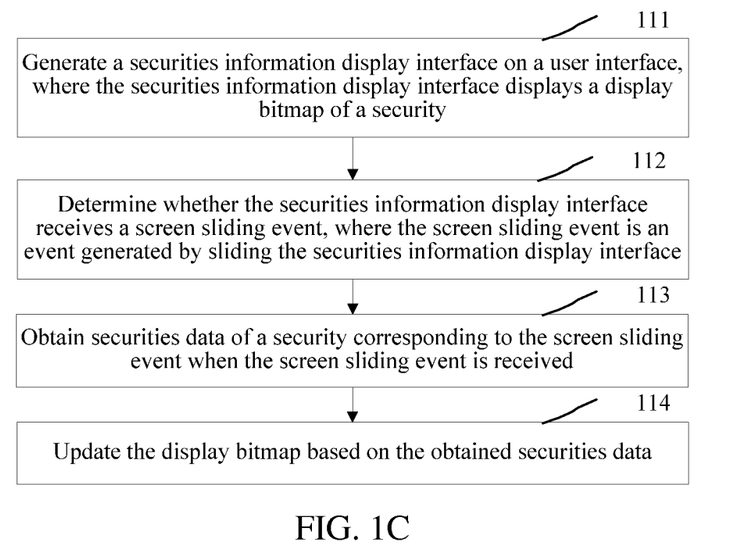
FIG. 1C is a schematic flowchart of a securities information display method according to an implementation manner of the present disclosure.

FIG. 1C is a schematic flowchart of a securities information display method according to an implementation manner of the present disclosure. The method may be applicable to a computer device having a user interface, and the user interface may be displayed on a display screen of the computer device. As shown in FIG. 1C, the method may include:

Step 111: Generate a securities information display interface on the user interface, where the securities information display interface displays a display bitmap of a security.

Step 112: Determine whether the securities information display interface receives a screen sliding event, where the screen sliding event is an event generated by sliding the securities information display interface.

Step 113: Obtain securities data of a security corresponding to the screen sliding event when the screen sliding event is received.

Step 114: Update the display bitmap based on the obtained securities data.

Figures 2A, 2C:
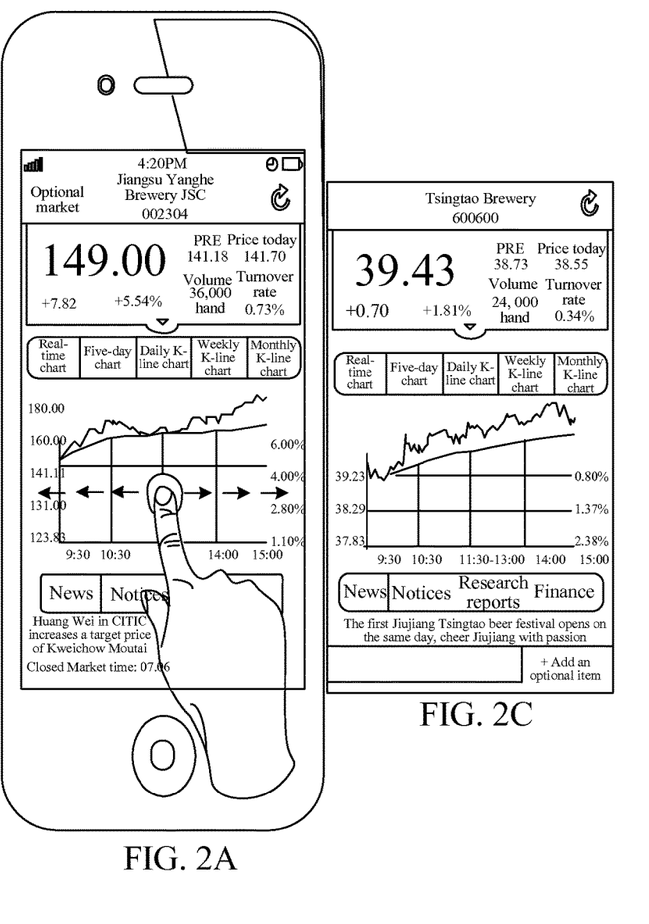
FIG. 2A to FIG. 2C are schematic diagrams of a securities information display operation according to an implementation manner of the present disclosure.
Figure 2B:
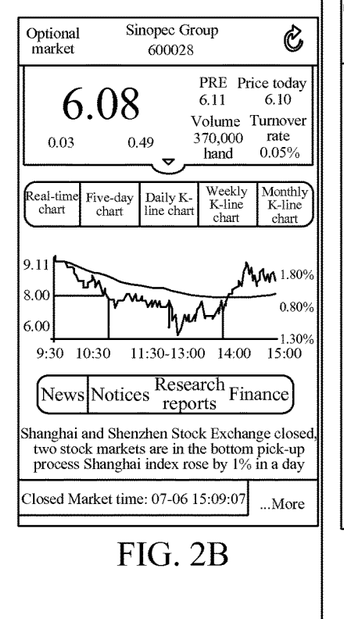

FIG. 2A to FIG. 2C are schematic diagrams of a securities information display operation according to an implementation manner of the present disclosure.

It can be seen from FIG. 2A to FIG. 2C that, detailed information of a security may be browsed quickly by using a finger interaction characteristic of a user, so that a switchover speed of securities information display is improved, the securities market can be reflected in time and a latest market trend is loaded, and switchover efficiency of securities information display is improved.

Moreover, it can be seen from FIG. 2A to FIG. 2C that, a pre-loading manner may be used to prepare in advance two static Views (as shown in FIG. 2B and FIG. 2C, the two static Views are invisible in normal times, and are only displayed after being triggered) separately at a left side and a right side of a current display view (as shown in FIG. 2A), and when a current security is displayed, at the same time, securities data of a security preceding the current security and a security subsequent to the current security in a securities queue display sequence is obtained, and interface filling, that is, filling of a display view, is completed. Then, when a user changes securities by sliding a finger left or right on a screen, the prepared securities display views may be loaded directly, as shown in FIG. 2B and FIG. 2C, so that a data display process is speeded up.

Based on the above detailed analysis, an implementation manner of the present disclosure further provides a securities information display apparatus.

Figure 3A:
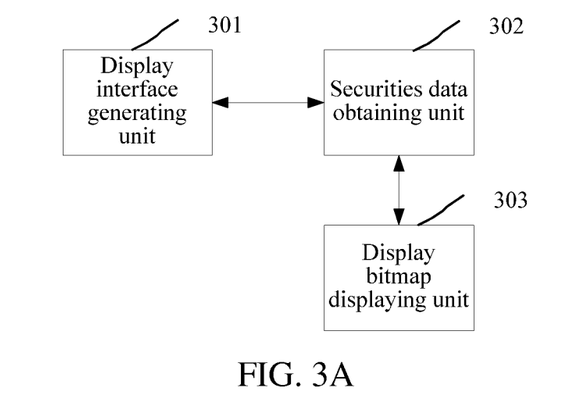
FIG. 3A is a schematic structural diagram of a securities information display apparatus according to an implementation manner of the present disclosure.

FIG. 3A is a schematic structural diagram of a securities information display apparatus according to an implementation manner of the present disclosure. As shown in FIG. 3A, the apparatus may include:

a display interface generating unit 301, configured to generate a securities information display interface, where the securities information display interface displays a display bitmap of a security;

a securities data obtaining unit 302, configured to determine whether the securities information display interface receives a screen sliding event, and obtain securities data of a security corresponding to the screen sliding event when the screen sliding event is received, where the screen sliding event is an event generated by sliding the securities information display interface; and a display bitmap displaying unit 303, configured to update the display bitmap based on the obtained securities data.

The foregoing securities information display interface may be displayed on a display screen of a securities information display terminal.

Figure 3B:
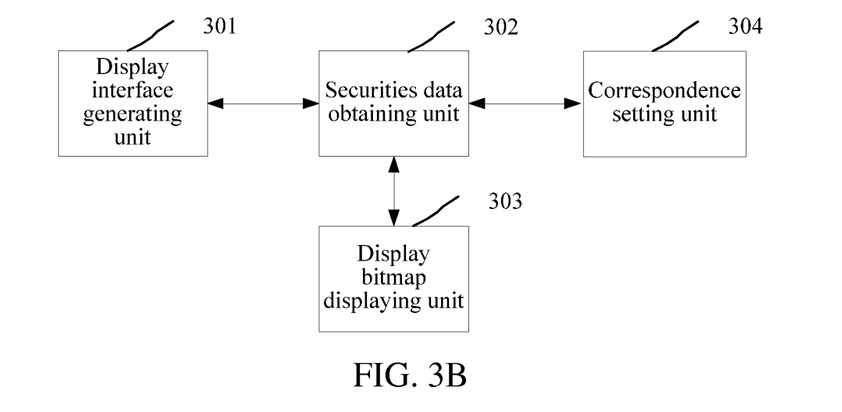
FIG. 3B is a schematic structural diagram of a securities information display apparatus according to an implementation manner of the present disclosure.

According to an implementation manner of the present disclosure, the securities information display apparatus may further include a correspondence setting unit 304, as shown in FIG. 3B.

The correspondence setting unit 304 is configured to set a correspondence between a screen sliding event and a securities queue display sequence.

The securities data obtaining unit 302 is configured to determine whether the screen sliding event is received, and obtain securities data of a current security corresponding to the screen sliding event after the screen sliding event is received.

The display bitmap displaying unit 303 is configured to generate a display bitmap of the current security based on the securities data of the current security, and display the display bitmap of the current security.

In an implementation manner, the securities data obtaining unit 302 is further configured to: obtain securities data of a subsequent security after the screen sliding event is received, and generate a display bitmap of the subsequent security based on the securities data of the subsequent security, and store the display bitmap of the subsequent security in a cache; and determine whether a screen sliding event corresponding to displaying the subsequent security is received, and if yes, obtain the display bitmap of the subsequent security from the cache.

The display bitmap displaying unit 303 is configured to display the display bitmap of the subsequent security.

In an implementation manner, the securities data obtaining unit 302 is further configured to: obtain securities data of a preceding security after the screen sliding event is received, and generate a display bitmap of the preceding security based on the securities data of the preceding security, and store the display bitmap of the preceding security in a cache; and determine whether a screen sliding event corresponding to displaying the preceding security is received, and if yes, obtain the display bitmap of the preceding security from the cache.

The display bitmap displaying unit 303 is configured to display the display bitmap of the preceding security.

In an implementation manner, the display bitmap displaying unit 303 is further configured to: pre-create a bitmap drawing process and a bitmap display process; enable the bitmap drawing process to generate a display bitmap of the current security based on the securities data of the current security corresponding to the screen sliding event, and to send the display bitmap to the bitmap display process; and enable the bitmap display process to display the display bitmap of the current security.

Figure 3C:
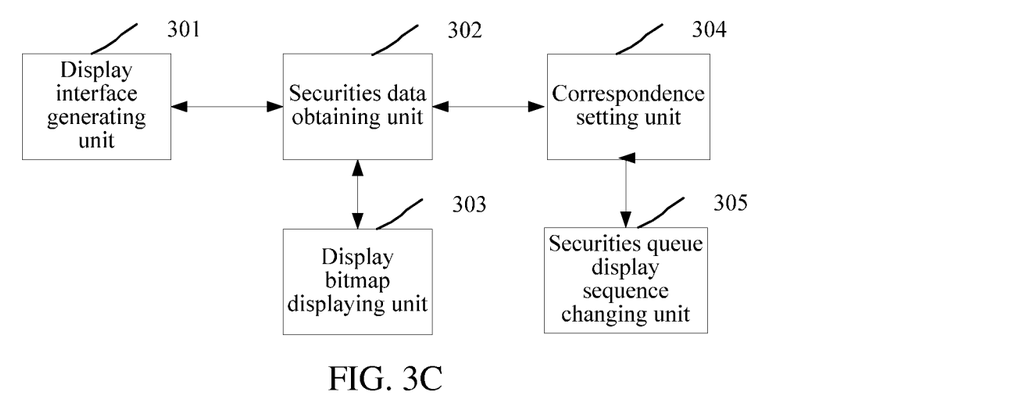
FIG. 3C is a schematic structural diagram of a securities information display apparatus according to an implementation manner of the present disclosure.

In an implementation manner, the apparatus may further include a securities queue display sequence changing unit 305, as shown in FIG. 3C.

The securities queue display sequence changing unit 305 is configured to: determine whether a securities queue display sequence changes, and if yes, obtain a changed securities queue display sequence; and send the changed securities queue display sequence to the correspondence setting unit 304.

The correspondence setting unit 304 is further configured to set a correspondence between a screen sliding event and the changed securities queue display sequence.

In an implementation manner, the display bitmap displaying unit 303 is configured to generate a real-time chart of the current security based on the securities data of the current security. The real-time chart may include at least one of a 5-day K line chart, a daily K line chart, a weekly K line chart, a monthly K line chart, and a quarterly K line chart.

The units in the foregoing embodiments of the present invention may be implemented by software (for example, a machine readable instruction that is stored in a computer readable medium and executed by a processor), may also be implemented by hardware (for example, a processor of an application specific integrated circuit (ASIC)), or may be implemented by a combination of software and hardware, which is not specifically limited in this embodiment of the present invention.

The units in the foregoing embodiments of the present invention may be integrated into one, and may also be deployed separately; may be combined into one unit, and may also be further split into multiple subunits.

Figure 3D:
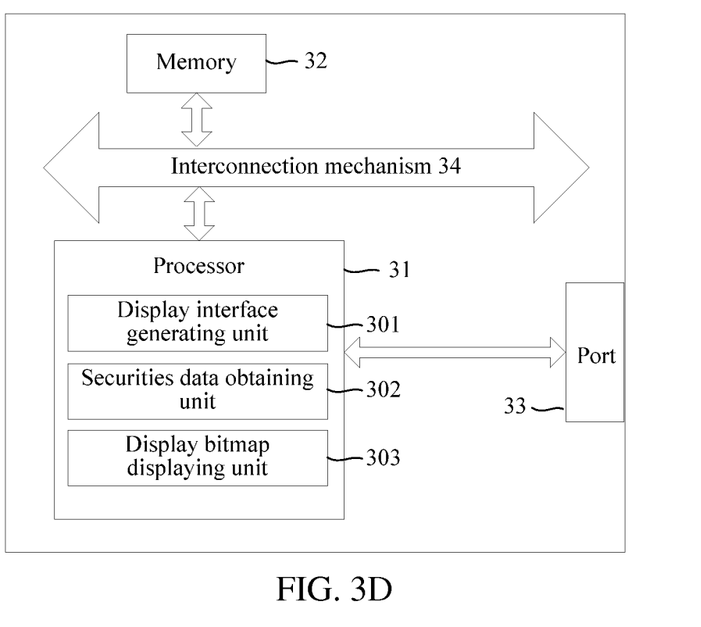
FIG. 3D is a schematic diagram of a hardware structure of a securities information display apparatus according to an implementation manner of the present disclosure.

FIG. 3D is a schematic diagram of a hardware structure of the securities information display apparatus according to the foregoing implementation manner of the present disclosure. As shown in FIG. 3D, the securities information display apparatus may include: a processor 31, a memory 32, at least one port 33, and an interconnection mechanism 34. The processor 31 and the memory 32 are interconnected through the interconnection mechanism 34. The apparatus may receive and sent data information through the port 33.

The memory 32 stores a machine readable instruction.

The processor 31 executes the machine readable instruction to perform the following operations:

generating a securities information display interface, where the securities information display interface displays a display bitmap of a security;

determining whether the securities information display interface receives a screen sliding event, where the screen sliding event is an event generated by sliding the securities information display interface;

obtaining securities data of a security corresponding to the screen sliding event when the screen sliding event is received; and updating the display bitmap based on the obtained securities data.

In this implementation manner of the present disclosure, the apparatus may further include a cache 35. In this case, the processor 31 executes the machine readable instruction stored in the memory 32 to further perform the following operations:

setting a correspondence between a screen sliding event and a securities queue display sequence;

obtaining securities data of a subsequent security according to the correspondence after the screen sliding event is received, and generating a display bitmap of the subsequent security based on the securities data of the subsequent security, and storing the display bitmap of the subsequent security in the cache 35, where the subsequent security is a security subsequent to the security corresponding to the screen sliding event in the securities queue display sequence; and determining whether a screen sliding event displaying the subsequent security is received, and if the screen sliding event displaying the subsequent security is received, obtaining the display bitmap of the subsequent security from the cache 35, and updating, according to the display bitmap of the subsequent security, the display bitmap displayed by the securities information display interface.

In this implementation manner of the present disclosure, the processor 31 may execute the machine readable instruction stored in the memory 32 to further perform all or some of the processes in the foregoing method embodiments, which is not described herein again.

Figure 3E:
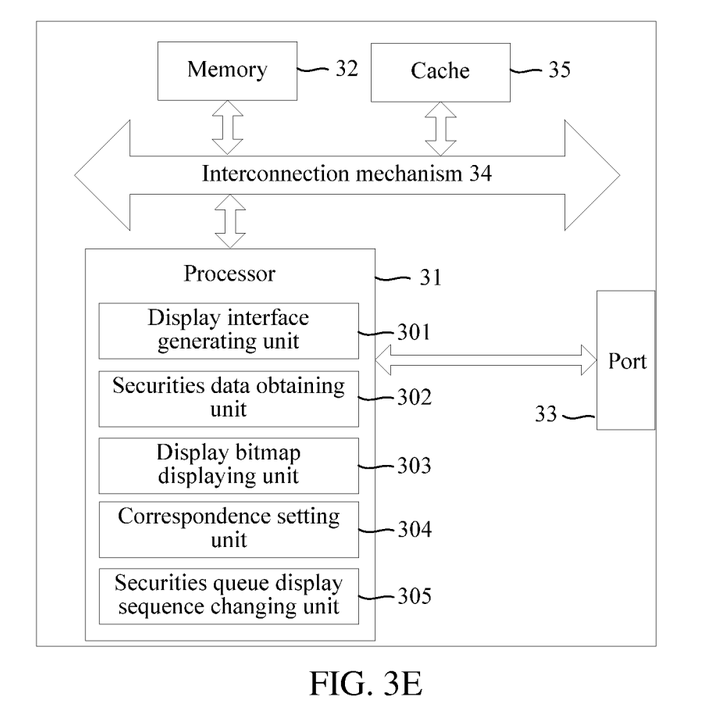
FIG. 3E is a schematic diagram of a hardware structure of a securities information display apparatus according to an implementation manner of the present disclosure.

It can be seen that, when the machine readable instruction stored in the memory 32 is executed by the processor 31, functions of the foregoing display interface generating unit 301, securities data obtaining unit 302, display bitmap displaying unit 303, correspondence setting unit 304, and securities queue display sequence changing unit 305 may be implemented. Therefore, a schematic diagram of a hardware structure of the securities information display apparatus provided in this implementation manner of the present disclosure may be shown in FIG. 3E.

Based on the foregoing detailed analysis, an implementation manner of the present disclosure further provides a securities information display system.

Figure 4:
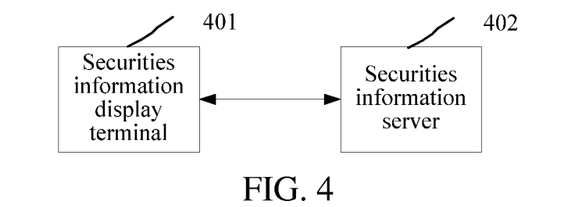
FIG. 4 is a schematic structural diagram of a securities information display system according to an implementation manner of the present disclosure.

FIG. 4 is a schematic structural diagram of a securities information display system according to an implementation manner of the present disclosure. As shown in FIG. 4, the system may include a securities information display terminal 401 and a securities information server 402.

In this implementation manner of the present disclosure, the securities information display terminal 401 is configured to generate a securities information display interface, where the securities information display interface displays a display bitmap of a security; and determine whether the securities information display interface receives a screen sliding event, request securities data of a security corresponding to the screen sliding event from the securities information server 402 when the screen sliding event is received, and update the display bitmap based on the securities data, obtained from the securities information server 402, of the security corresponding to the screen sliding event, where the screen sliding event is an event generated by sliding the securities information display interface.

The securities information server 402 is configured to: in response to a request of the securities information display terminal 401, send the securities data of the security corresponding to the screen sliding event to the securities information display terminal 401.

According to an implementation manner of the present disclosure, the securities information display terminal 401 is configured to set a correspondence between a screen sliding event and a securities queue display sequence, determine whether the screen sliding event is received, and request securities data of a current security corresponding to the screen sliding event from the securities information server 402 after the screen sliding event is received.

The securities information server 402 is configured to: in response to a request of the securities information display terminal 401, provide the securities data of the current security corresponding to the screen sliding event to the securities information display terminal 401.

The securities information display terminal 401 is configured to generate a display bitmap of the current security based on the securities data of the current security, and display the display bitmap of the current security.

In an implementation manner, the securities information display terminal 401 is further configured to: further obtain securities data of a subsequent security from the securities information server 402 after the screen sliding event is received, and generate a display bitmap of the subsequent security based on the securities data of the subsequent security, and cache the display bitmap of the subsequent security.

The securities information display terminal 401 is further configured to determine whether a screen sliding event corresponding to displaying the subsequent security is received, and if yes, obtain the display bitmap of the subsequent security from a cache, and display the display bitmap of the subsequent security.

In an implementation manner, the securities information display terminal 401 is further configured to: further obtain securities data of a preceding security from the securities information server 402 after the screen sliding event is received, and generate a display bitmap of the preceding security based on the securities data of the preceding security, and cache the display bitmap of the preceding security.

The securities information display terminal 401 is further configured to determine whether a screen sliding event corresponding to displaying the preceding security is received, and if yes, obtain the display bitmap of the preceding security from a cache, and display the display bitmap of the preceding security.

In an implementation manner, the securities information server 402 is further configured to store a correspondence between a screen sliding event and a securities queue display sequence, and when the securities queue display sequence changes, send a changed securities queue display sequence to the securities information display terminal 401.

The securities information display terminal 401 is configured to set a correspondence between a screen sliding event and the changed securities queue display sequence.

In an implementation manner, the securities information display terminal 401 is configured to generate a real-time chart of the current security based on the securities data of the current security. The real-time chart may include at least one of a 5-day K line chart, a daily K line chart, a weekly K line chart, a monthly K line chart, and a quarterly K line chart.

In an implementation manner, the securities information display terminal 401 may be: a feature phone, a smart phone, a handheld computer, a personal computer (PC), a tablet computer, or a personal digital assistant (PDA), or the like.

The method shown in FIG. 1A and FIG. 1B may be integrated into hardware entities of various communication networks in a form of an instruction. For example, the securities information display method may be integrated into a computer device in a form of an instruction. The computer device may be: a feature phone, a smart phone, a handheld computer, a PC, a tablet computer, or a PDA, or the like. The computer device may include at least one processor and memory. The memory stores a machine readable instruction. When the machine readable instruction is executed by the processor, all or some of the processes in the foregoing method embodiments of the present invention may be implemented. The memory may be a magnetic disk, an optical disc, a read-only memory (ROM), or a random access memory (RAM), or the like.

Actually, the securities information display apparatus provided in the implementation manners of the present disclosure may be specifically implemented in various manners. For example, by following an application program interface of a certain standard, a plug-in program may be compiled for the securities information display apparatus, and the securities information display apparatus may also be encapsulated to an application program for a user to download for use. When a plug-in program is compiled for the securities information display apparatus provided in the implementation manners of the present disclosure, the plug-in program may be implemented as various plug-in forms such as ocx, dll, cab, and the like. The securities information display apparatus provided in the implementation manners of the present disclosure may also be implemented by using a specific technology such as a Flash plug-in, a RealPlayer plug-in, an MMS plug-in, an MIDI staff plug-in, an ActiveX plug-in, or the like.

The securities information display method provided in the implementation manners of the present disclosure may be stored in various storage mediums in a storage manner of instruction or instruction set storage. These storage mediums include, but are not limited to: a floppy disk, an optical disc, a DVD, a hard disk, a flash memory, a USB flash drive, a CF card, an SD card, an MMC card, an SM card, a memory stick, an XD card, and the like.

In addition, the securities information display method provided in the implementation manners of the present disclosure may also be applied to a storage medium that is based on a Nand flash, such as a USB flash drive, a CF card, an SD card, an SDHC card, an MMC card, an SM card, a memory stick, an XD card, or the like.

In conclusion, in the implementation manners of the present disclosure, a securities information display interface is generated first, where the securities information display interface displays a display bitmap of a security; whether the securities information display interface receives a screen sliding event is determined, and securities data of a security corresponding to the screen sliding event is obtained when the screen sliding event is received; and the display bitmap is updated based on the obtained securities data. It can be seen that, after the implementation manners of the present disclosure are applied, a finger interaction characteristic of sliding sensing technologies is fully utilized, which can improve a switchover speed of securities information display, so that the securities market can be reflected in time and a latest market trend is loaded, and switchover efficiency of securities information display is improved.

In addition, after the implementation manners of the present disclosure are applied, when a security is switched for display, at the same time, latest data of another security (for example, a security subsequent to a current security corresponding to a screen sliding event) may be loaded automatically and a market trend chart may be updated dynamically, that is, a user completes functions of securities switchover and data refreshing only by using one sliding motion, a cache mechanism is considered fully, and a switchover speed and a data refreshing speed of securities information are greatly improved.

In addition, the implementation manners of the present disclosure may be applied to various terminal entities, and the implementation manners of the present disclosure may be used cross platforms and cross terminals, and have a very wide application scope.

Hardware modules or units in the implementation manners of the present disclosure may be implemented in mechanical or electronic means. For example, a hardware module may include a specifically designed permanent circuit or logic device (for example, a dedicated processor, such as an FPGA or ASIC) for completing a specific operation. The hardware module may also include a programmable logic device or circuit configured temporarily by software (for example, including a general processor or another programmable processor) for executing a specific operation. Whether a mechanical means, or a specific permanent circuit, or a temporarily configured circuit (for example, configured by software) is specifically used to implement the hardware module may be determined according to cost and time considerations.

Through description of the foregoing implementation manners, a person skilled in the art may clearly understand that the present disclosure may be implemented by using software and a necessary general hardware platform, that is, implemented by using a machine readable instruction instructing related hardware, and certainly, may also be implemented by using hardware, but in many cases, the former is a better implementation manner. Based on such an understanding, the technical solutions of the present disclosure essentially, or the part contributing to the prior art may be implemented in a form of a software product. The computer software product is stored in a storage medium and includes several instructions for instructing a terminal device (which may be a personal computer, a server, a network device, or the like) to perform the methods described in the embodiments of the present invention.

A person of ordinary skill in the art may understand that all or some of the processes of the methods in the foregoing embodiments may be implemented by a machine readable instruction instructing related hardware modules, and the machine readable instruction may be stored in a computer readable storage medium. When the machine readable instruction is executed, processes of the embodiments of the foregoing methods may be implemented. The storage medium may be a magnetic disk, an optical disc, a ROM, or a RAM, or the like.

The accompanying drawings in the implementation manners of the present disclosure are only some embodiments, units and steps in the drawings are not necessarily needed for implementing the present disclosure. The units may be combined into one unit, or further split into multiple sub-units.

The above descriptions are the embodiments of the present invention, and are not used to limit the protection scope of the present disclosure. Any modification, equivalent replacement, or improvement made within the spirit and principle of the present disclosure shall fall within the protection scope of the present disclosure.

What is claimed is:

1. A securities information display method, comprising:
by a securities information display apparatus comprising one or more processors,
generating a securities information display interface, wherein the securities information display interface displays a display bitmap of an electronic security;
setting a correspondence between a screen sliding event and a securities queue display sequence;
determining that the securities information display interface, which displays a first display bitmap of a current electronic security, receives a first screen sliding event, wherein the first screen sliding event being an event generated by sliding the securities information display interface in a first direction;
in response to determining that the first screen sliding event in the first direction is received with respect to the current electronic security displayed on the securities information display interface, performing the following operations:
(a) obtaining securities data of a subsequent electronic security corresponding to the first screen sliding event in the first direction, the subsequent electronic security being subsequent to the current electronic security in the securities queue display sequence;
(b) obtaining securities data of a further subsequent electronic security according to the correspondence in response to the first screen sliding event being received, generating a second display bitmap of the further subsequent electronic security based on the securities data of the further subsequent electronic security, and storing the second display bitmap of the further subsequent electronic security in a cache, wherein the further subsequent electronic security is an electronic security subsequent to the subsequent electronic security in the securities queue display sequence; and
(c) updating the first display bitmap based on the obtained securities data of the subsequent electronic security, and displaying the updated first display bitmap; and
determining that a second screen sliding event in the first direction is received via the securities information display interface, which displays the subsequent electronic security, and in response to determining that the second screen sliding event in the first direction is received, obtaining the second display bitmap of the further subsequent electronic security from the cache, and displaying the second display bitmap of the further subsequent electronic security on the securities information display interface.

2. The securities information display method according to claim 1, further comprising:
obtaining securities data of a preceding electronic security according to the correspondence in response to the first screen sliding event in the first direction being received, generating a third display bitmap of the preceding electronic security based on the securities data of the preceding electronic security, and storing the third display bitmap of the preceding electronic security in the cache, wherein the preceding electronic security is an electronic security preceding the subsequent electronic security in the securities queue display sequence; and determining that a third screen sliding event in a second direction, opposite to the first direction, is received via the securities information display interface, which displays the subsequent electronic security, and based on a determination that the third screen sliding event in the second direction is received, obtaining the third display bitmap of the preceding electronic security from the cache, and displaying the third display bitmap of the preceding electronic security on the securities information display interface.

3. The securities information display method according to claim 1, wherein:

the updating the first display bitmap based on the obtained securities data comprises:

generating, based on the obtained securities data, a fourth display bitmap of the subsequent electronic security, and the displaying the updated fourth display bitmap comprises displaying the fourth display map of the subsequent electronic security.

4. The securities information display method according to claim 1, further comprising:

determining that the securities queue display sequence changes, and based on a determination that the securities queue display sequence changes, obtaining a changed securities queue display sequence; and setting a correspondence between a screen sliding event and the changed securities queue display sequence.

5. The securities information display method according to claim 1, wherein the updating the first display bitmap based on the obtained securities data comprises:

generating, based on the obtained securities data, a real-time chart of the electronic security corresponding to the first screen sliding event;

wherein the real-time chart comprises at least one of a 5-day K line chart, a daily K line chart, a weekly K line chart, a monthly K line chart, and a quarterly K line chart.

6. A securities information display apparatus, comprising a memory and a processor communicating with the memory, the memory being configured to store instructions that when executed by the processor, configure the processor to:

generate a securities information display interface, the securities information display interface displaying a display bitmap of an electronic security;

set a correspondence between a screen sliding event and a securities queue display sequence;

determine that the securities information display interface, which displays a first display bitmap of a current electronic security, receives a first screen sliding event, wherein the first screen sliding event being an event generated by sliding the securities information display interface in a first direction;

in response to determining that the first screen sliding event in the first direction is received with respect to the current electronic security displayed on the securities information display interface, perform the following operations:

(a) obtaining securities data of a subsequent electronic security corresponding to the first screen sliding event in the first direction, the subsequent electronic security being subsequent to the current electronic security in the securities queue display sequence;

(b) obtaining securities data of a further subsequent electronic security according to the correspondence in response to the first screen sliding event being received, generating a second display bitmap of the further subsequent electronic security based on the securities data of the further subsequent electronic security, and storing the second display bitmap of the further subsequent electronic security in a cache, wherein the further subsequent electronic security is an electronic security subsequent to the subsequent electronic security in the securities queue display sequence; and (c) updating the first display bitmap based on the obtained securities data of the subsequent electronic security, and displaying the updated first display bitmap; and determine that a second screen sliding event in the first direction is received via the securities information display interface, which displays the subsequent electronic security, and in response to determining that the second screen sliding event in the first direction is received, obtain the second display bitmap of the further subsequent electronic security from the cache, and display the second display bitmap of the further subsequent electronic security on the securities information display interface.

7. The securities information display apparatus according to claim 6, wherein when being executed by the processor, the instructions further configure the processor to:

obtain securities data of a preceding electronic security according to the correspondence in response to the first screen sliding event in the first direction being received, generate a third display bitmap of the preceding electronic security based on the securities data of the preceding electronic security, and store the third display bitmap of the preceding electronic security in the cache, wherein the preceding electronic security is an electronic security preceding the subsequent electronic security in the securities queue display sequence; and determine that a third screen sliding event in a second direction, opposite to the first direction, is received via the securities information display interface, which displays the subsequent electronic security, and based on a determination that the third screen sliding event in the second direction is received, obtain the third display bitmap of the preceding electronic security from the cache, and display the third display bitmap of the preceding electronic security on the securities information display interface.

8. The securities information display apparatus according to claim 6, wherein when being executed by the processor, the instructions further configure the processor to perform (c) updating the first display bitmap and displaying the updated first display bitmap by generating, based on the obtained securities data, a fourth display bitmap of the subsequent electronic security, and displaying the fourth display bitmap of the subsequent electronic security.

9. The securities information display apparatus according to claim 6, wherein when being executed by the processor, the instructions further configure the processor to:

determine that the securities queue display sequence changes, and based on a determination that the securities queue display sequence changes, obtain a changed securities queue display sequence; and send the changed securities queue display sequence to a correspondence setting unit; and set a correspondence between the screen sliding event and the changed securities queue display sequence.

10. The securities information display apparatus according to claim 6, wherein when being executed by the processor, the instructions further configure the processor to:
generate, based on the obtained securities data, a real-time chart of the electronic security corresponding to the screen sliding event, wherein the real-time chart comprises at least one of a 5-day K line chart, a daily K line chart, a weekly K line chart, a monthly K line chart, and a quarterly K line chart.

11. A securities information display system, comprising:
a securities information display terminal, configured to:
generate a securities information display interface, wherein the securities information display interface displays a display bitmap of an electronic security;
set a correspondence between a screen sliding event and a securities queue display sequence,
determine that the securities information display interface, which displays a first display bitmap of a current electronic security, receives a first screen sliding event in a first direction, the first screen sliding event being an event generated by sliding the securities information display interface in the first direction;
in response to determining that the first screen sliding event in the first direction is received with respect to the current electronic security displayed on the securities information display interface, performing the following operations:
(a) request securities data of a subsequent electronic security corresponding to the first screen sliding event in the first direction from a securities information server in response to determining that the first screen sliding event in the first direction is received with respect to the current electronic security displayed on the securities information display interface;
(b) obtain securities data of a further subsequent electronic security from the securities information server according to the correspondence, generate a second display bitmap of the further subsequent electronic security based on the securities data of the further subsequent electronic security, and store the second display bitmap of the further subsequent electronic security in a cache; and
(c) update the first display bitmap based on the securities data, obtained from the securities information server, of the subsequent electronic security corresponding to the first screen sliding event, wherein the subsequent electronic security is subsequent to the current electronic security in the securities queue display sequence; and
the securities information server, configured to: in response to a request of the securities information display terminal, transmit the securities data of the subsequent electronic security corresponding to the first screen sliding event in the first direction to the securities information display terminal,
the securities information display terminal being further configured to: determine that a second screen sliding event in the first direction is received, and in response to determining that the second screen sliding event in the first direction is received, obtain the second display bitmap of the further subsequent electronic security from the cache, and display the second display bitmap of the further subsequent electronic security, wherein the further subsequent electronic security is an electronic security subsequent to the subsequent electronic security in the securities queue display sequence.

12. The securities information display system according to claim 11, wherein
the securities information display terminal is further configured to: obtain securities data of a preceding electronic security from the securities information server according to the correspondence in response to the first screen sliding event in the first direction being received, generate a third display bitmap of the preceding electronic security based on the securities data of the preceding electronic security, and store the third display bitmap of the preceding electronic security in the cache; and
determine that a third screen sliding event in a second direction, opposite to the first direction, is received via the securities information display interface, which displays the subsequent electronic security, and based on a determination that the third screen sliding event in the second direction is received, obtain the third display bitmap of the preceding electronic security from the cache, and display the third display bitmap of the preceding electronic security on the securities information display interface, wherein
the preceding electronic security is an electronic security preceding the subsequent electronic security corresponding to the screen sliding event in the securities queue display sequence.

13. The securities information display system according to claim 11, wherein
the securities information server is further configured to store the correspondence between the screen sliding event and the securities queue display sequence, and in response to a change of the securities queue display sequence, send a changed securities queue display sequence to the securities information display terminal; and
the securities information display terminal is further configured to set a correspondence between the screen sliding event and the changed securities queue display sequence.

* * * * *